US006332446B1

United States Patent
Matsumoto et al.

(10) Patent No.: US 6,332,446 B1
(45) Date of Patent: Dec. 25, 2001

(54) INTERNAL COMBUSTION ENGINE HAVING SOLENOID-OPERATED VALVES AND CONTROL METHOD

(75) Inventors: Isao Matsumoto; Hideyuki Nishida, both of Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/563,157

(22) Filed: May 1, 2000

(30) Foreign Application Priority Data

May 21, 1999 (JP) ................................................. 11-142382

(51) Int. Cl.[7] ................................................. F02B 77/00
(52) U.S. Cl. .................................. 123/198 F; 123/90.11; 123/90.15
(58) Field of Search ................... 123/198 F, 198 DB, 123/198 DC, 198 D, 90.11, 90.15, 481

(56) References Cited

U.S. PATENT DOCUMENTS

| 4,292,938 | * | 10/1981 | Tanaka et al. | 123/198 F |
| 4,337,740 | * | 7/1982 | Sugasawa et al. | 123/672 |
| 4,345,571 | * | 8/1982 | Iizuka et al. | 123/568 |
| 4,354,471 | * | 10/1982 | Sugasawa et al. | 123/481 |
| 4,364,345 | * | 12/1982 | Tsutsumi et al. | 123/198 F |
| 5,408,966 | * | 4/1995 | Lipinski et al. | 123/198 F |
| 5,467,748 | * | 11/1995 | Stockhausen | 123/198 F |
| 5,492,100 | * | 2/1996 | Ishii et al. | 123/481 |
| 5,584,266 | * | 12/1996 | Motose et al. | 123/73 A |
| 5,642,703 | * | 7/1997 | Stockhausen et al. | 123/198 F |
| 5,727,527 | * | 3/1998 | Mueller et al. | 123/481 |
| 5,787,855 | * | 8/1998 | Mueller et al. | 123/198 F |
| 5,797,371 | * | 8/1998 | Nonaka | 123/481 |
| 5,975,052 | * | 11/1999 | Moyer | 123/406.23 |
| 5,992,390 | * | 11/1999 | Moyer | 123/481 |
| 6,073,596 | * | 6/2000 | Kemper | 123/90.11 |
| 6,138,636 | * | 10/2000 | Kohno et al. | 123/198 F |

FOREIGN PATENT DOCUMENTS

| 4126204 | * | 2/1993 | (DE) | F02D/17/00 |
| 2119853A | | 11/1983 | (GB) . | |
| 57035133 | | 2/1982 | (JP) . | |
| 07119502 | | 5/1995 | (JP) . | |
| A-7-279697 | | 10/1995 | (JP) . | |

* cited by examiner

*Primary Examiner*—Willis R. Wolfe
*Assistant Examiner*—Hai Huynh
(74) *Attorney, Agent, or Firm*—Oliff & Berridge PLC (57) ABSTRACT

An internal combustion engine including solenoid-operated intake and exhaust valves is operable in a partial operating mode with at least one cylinder being deactivated, without suffering from vibration of the engine. Where particular cylinders are deactivated under cylinder deactivation control, the exhaust valve of each deactivated or inactive cylinder is opened for a certain period of time which starts ahead of the bottom dead center. The timing of opening the exhaust valve is determined so that the pressure within the inactive cylinder is lower than the atmospheric pressure when the exhaust valve is opened. The timing of closing the exhaust valve is determined so that the peak value of the pressure within the inactive cylinder becomes almost equal to the peak value of the pressure within active cylinders. Where the cylinders are successively deactivated with the engine operating on a six-stroke cycle, opening and closing actions of the exhaust valve are controlled so that an increase in the cylinder pressure due to compression of gas in the currently deactivated cylinder and an increase in the cylinder pressure due to combustion in an active cylinder do not occur at the same time.

16 Claims, 11 Drawing Sheets

FIG.10A
PRESSURE WITHIN EACH CYLINDER

FIG.10B
COMPOSITE CYLINDER PRESSURE

FIG. 11

INTERNAL COMBUSTION ENGINE HAVING SOLENOID-OPERATED VALVES AND CONTROL METHOD

INCORPORATION BY REFERENCE

The disclosure of Japanese Patent Application No. HEI 11-142382 filed on May 21, 1999 including the specification, drawings and abstract is incorporated herein by reference in its entirety.

BACKGROUND OF THE INVENTION

1. Field of the Invention

The invention relates to an internal combustion engine having solenoid-operated valves, and in particular to such an engine having solenoid-operated valves, which is operable in a partial operating mode with at least one of the cylinders being deactivated by inhibiting combustion therein under cylinder deactivation control. The invention also relates to a control method for controlling such an internal combustion engine.

2. Description of Related Art

Internal combustion engines capable of performing cylinder deactivation control under which a selected one or more of cylinders is/are deactivated or disabled are known in the art, and one example of such engines is disclosed in Japanese Patent Laid-Open Publication No. 7-279697. In this type of engine, fuel injection and ignition are stopped with respect to one or more cylinders selected from a plurality of cylinders of the engine, and cylinder deactivation control is performed by keeping an intake valve and an exhaust valve in their closed positions. Here, "deactivating a cylinder" means inhibiting any of suction of an air/fuel mixture, combustion, and exhaust of combustion gas, while allowing reciprocating motion of the piston. In the following description, cylinders that are deactivated or disabled under cylinder deactivation control will be called "inactive cylinders" or "deactivated cylinders" when appropriate, and cylinders in which combustion takes place even when the engine is in a partial operating mode are called "active cylinders" or "activated cylinders." With the cylinder deactivation control performed, the fuel injection is inhibited in the inactive cylinders, and pumping loss can be reduced, with a result of improved fuel efficiency.

To perform cylinder deactivation control, only a particular cylinder or cylinders may be deactivated or disabled, or the cylinders of the engine may be successively deactivated in a certain order.

In the case where particular cylinders are selected as inactive cylinders, gas contained in the combustion chamber of each inactive cylinder slowly leaks into the crankcase through a sliding surface of the piston, and the pressure within the inactive cylinder becomes lower than the pressure of active cylinders. Consequently, torque variations arise from a difference between the pressure within the active cylinders and the pressure within the inactive cylinders, resulting in increased vibration of the engine.

Where the cylinders of the engine are successively deactivated in a certain order, there arises almost no reduction in the pressure within the currently deactivated cylinder due to the gas leakage as described above. When the piston of the inactive cylinder reaches the top dead center, therefore, burnt gas contained in the combustion chamber is compressed so that the pressure within the inactive cylinder increases to substantially the same level as that achieved upon combustion. Here, the sum of the cylinder pressures in the engine as a whole differs depending upon whether or not the timing of an increase in the pressure within the inactive cylinder coincides with the timing of an increase in the cylinder pressure due to combustion in an active cylinder. Accordingly, even if the cylinders are successively deactivated one after another, the engine still suffers from increased vibration due to variations in the output torque of the engine.

SUMMARY OF THE INVENTION

It is therefore an aspect of the invention to control an increase in vibration of the internal combustion engine caused by execution of cylinder deactivation control.

To control an increase in vibration of the engine, the invention provides an internal combustion engine having solenoid-operated valves, which engine includes a plurality of cylinders and a controller. The controller causes at least one of the plurality of cylinders to operate in a cylinder deactivation mode in which the intake stroke, combustion stroke and exhaust stroke are inhibited, and controls the pressure within each inactive cylinder that operates in the cylinder deactivation mode.

With the internal combustion engine constructed as described above or a control method according to the invention, it is possible to suppress vibration of the engine due to variations in the cylinder pressures.

BRIEF DESCRIPTION OF THE DRAWINGS

The foregoing and further aspects, features and advantages of the invention will become apparent from the following description of preferred embodiments with reference to the accompanying drawings, wherein.

DETAILED DESCRIPTION OF PREFERRED EMBODIMENTS

Preferred embodiments of the invention will be described with reference to the drawings.

Figure 1:
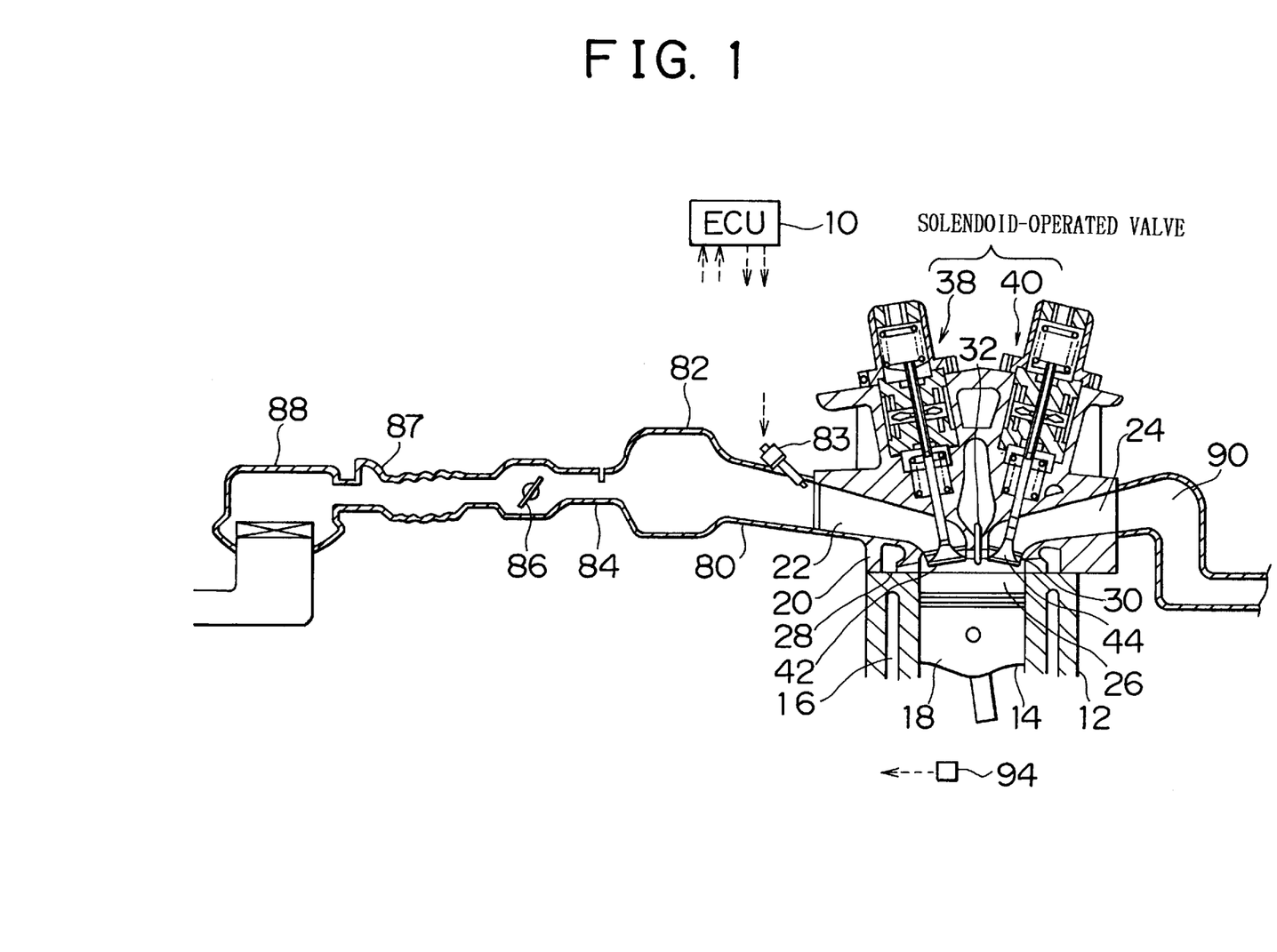
FIG. 1 is a view showing the construction of an internal combustion engine that employs a controller of solenoid-operated valves as one embodiment of the invention.

FIG. 1 shows the construction of an internal combustion engine of the first embodiment of the invention. While the internal combustion engine takes the form of a four-cylinder engine having four cylinders, only one cylinder 14 is illustrated in FIG. 1 for the purpose of further explanation. The engine is controlled by an electronic control unit (hereinafter abbreviated to "ECU") 10. The cylinder 14 and water jacket 16 are formed within a cylinder block 12. A piston 18 is located in the inner bore of the cylinder 14 such that the piston 18 is slidable along the side wall of the cylinder 14 in the vertical direction as viewed in FIG. 1. A cylinder head 20 is fixed in position on the cylinder block 12. For each cylinder, an intake port 22 and an exhaust port 24 are formed in the cylinder head 20.

A combustion chamber 26 of the engine is defined by the bottom face of the cylinder head 20, the top face of the piston 18, and the side wall of the cylinder 14. The intake port 22 and exhaust port 24 are both open to the combustion chamber 26. Valve seats 28, 30 are formed at an opening end portion of the intake port 22 which faces the combustion chamber 26, and an opening end portion of the exhaust port 24 which faces the combustion chamber 26. Also, a distal end portion of a spark plug 32 is exposed to the combustion chamber 26.

Solenoid-operated valves 38, 40 are incorporated in the cylinder head 20. The solenoid-operated valve 38 includes an intake valve 42. The intake valve 42 may be seated against the valve seat 28, thereby to block off the intake port 22 from the combustion chamber 26. When the intake valve 42 is separated or lifted away from the valve seat 28, the intake port 22 and the combustion chamber 26 are brought into communication with each other. Similarly, the exhaust valve 44 mounted in the solenoid-operated valve 40 may be seated against the valve seat 30, thereby to block off the exhaust port 24 from the combustion chamber 26. When the exhaust valve 44 is separated or lifted away from the valve seat 30, the exhaust port 24 and the combustion chamber 26 are brought into communication with each other.

Figure 2:
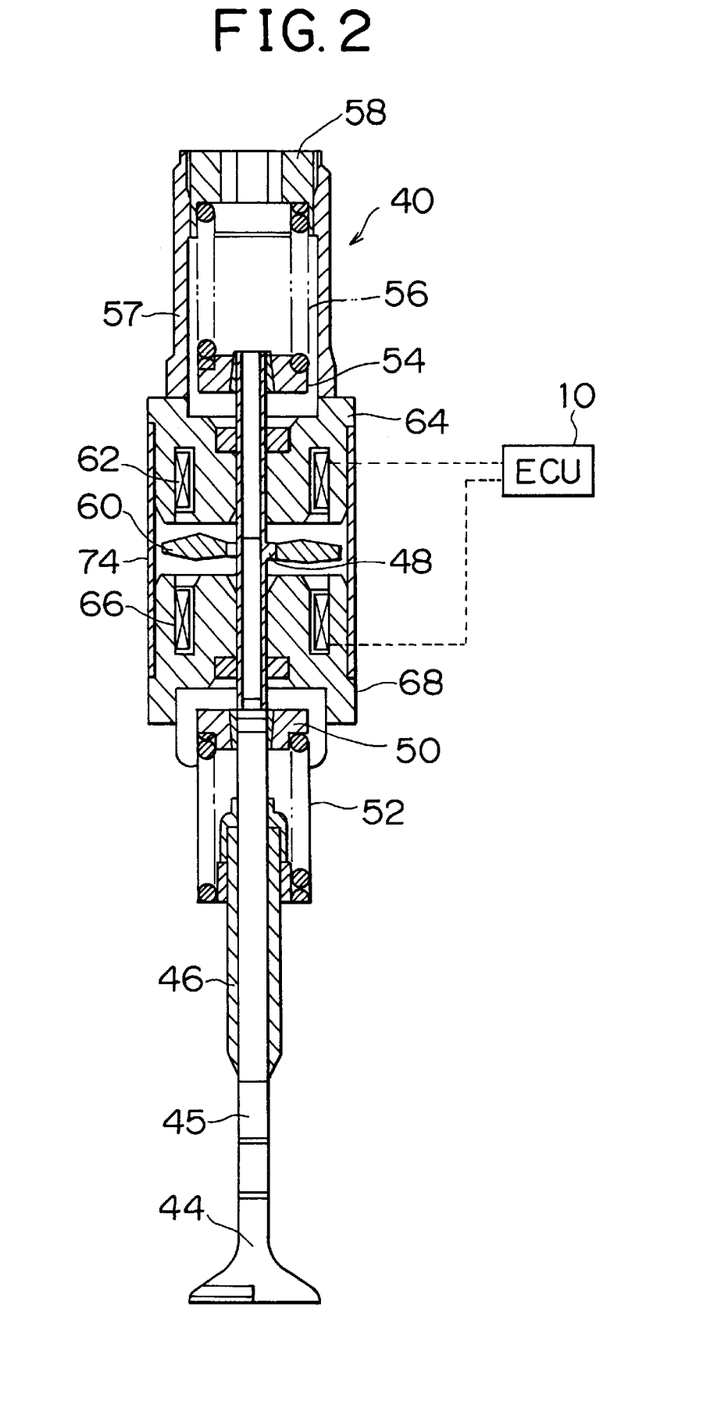
FIG. 2 is a cross-sectional view showing the whole construction of a solenoid-operated valve provided in the engine.

The construction and operation of the solenoid-operated valves 38 and 40 will be now described. FIG. 2 is a cross-sectional view showing the whole construction of the solenoid-operated valve 40. The construction of the solenoid-operated valve 38 is similar to that of the solenoid-operated valve 40, and therefore no description of the valve 38 will be provided herein.

As shown in FIG. 2, the exhaust valve 44 includes a valve shaft 45 that extends upwards. The valve shaft 45 is supported by a valve guide 46 that is fixed within the cylinder head 20 such that the valve shaft 45 is movable in the axial direction. An armature shaft 48 in the form of a rod-like member made of a non-magnetic material is provided on the valve shaft 45, such that the lower end face of the armature shaft 48 abuts on the upper end face of the valve shaft 45.

A lower retainer 50 is fixed to the upper end portion of the valve shaft 45. A lower spring 52 is mounted on the lower portion of the lower retainer 50. The lower end of the lower spring 52 abuts on the cylinder head 20. The lower spring 52 serves to bias the lower retainer 50 and the armature shaft 48 upwards as viewed in FIG. 2.

An upper retainer 54 is fixed to the upper end portion of the armature shaft 48. An upper spring 56 is located such that its lower end portion abuts on the upper portion of the upper retainer 54. A cylindrical upper cap 57 is disposed around the upper spring 56 so as to surround its outer periphery. The upper end portion of the upper spring 56 abuts on an adjuster bolt 58 that is screwed on the upper cap 57. The upper spring 56 serves to bias the upper retainer 54 and the armature shaft 48 downwards as viewed in FIG. 2.

An armature 60 in the form of an annular member made of a soft, magnetic material is joined to the outer periphery of the armature shaft 48. An upper coil 62 and an upper core 64 are disposed above the armature 60. Also, a lower coil 66 and a lower core 68, both of which are formed of a magnetic material, are disposed below the armature 60. The armature shaft 48 is slidably supported by central portions of the upper core 64 and lower core 68. The upper coil 62 and lower coil 66 are connected to the ECU 10. Under control of the ECU 10, certain exciting current is supplied to the upper coil 62 and lower coil 66.

The upper core 64 and the lower core 68 are supported by an outer sleeve 74 such that the cores 64, 68 are spaced at a predetermined distance from each other. The upper cap 57 is fixed to the upper end face of the upper core 64. Also, the position of the adjuster bolt 58 is adjusted so that the armature 60 is located intermediate between the upper core 64 and the lower core 68 when it is in the neutral position.

Next, the operation of the solenoid-operated valve 40 will be described.

In the solenoid-operated valve 40, the exhaust valve 44 is seated against the valve seat 28 when the armature 60 abuts on the upper core 64. This state is maintained with certain exciting current being supplied to the upper coil 62. In the following description, the position at which the exhaust valve 44 is seated against the valve seat 30 will be called "fully closed position" of the exhaust valve 44.

If exciting current supplied to the upper coil 62 is cut off while the exhaust valve 44 is being kept in the fully closed position, electromagnetic force that has acted on the armature 60 disappears. As a result, the armature 60 displaces or moves downwards in FIG. 2 under the biasing force of the upper spring 56. If suitable exciting current is supplied to the lower coil 66 at a point of time when the amount of displacement of the armature 60 reaches a predetermined value, a force is then generated to pull or attract the armature 60 toward the lower core 68. As a result, the armature 60 moves downwards in FIG. 2 along with the exhaust valve 44, against the biasing force of the lower spring 52. The exhaust valve 44 continues to be moved until the armature 60 abuts on the lower core 68. In the following description, the position of the exhaust valve 44 at which the armature 60 abuts on the lower core 68 will be called "fully open position". This state is maintained with certain exciting current being supplied to the lower coil 66.

If exciting current supplied to the lower coil 66 is cut off while the exhaust valve 44 is being kept in the fully open position, electromagnetic force that has acted upon the armature 60 disappears. If the electromagnetic force that has acted upon the armature 60 disappears, the armature 60 displaces or moves upwards in FIG. 2 under the biasing force of the lower spring 52. If suitable exciting current is supplied to the upper coil 62 at a point of time when the amount of displacement of the armature 60 reaches a predetermined value, a force to pull or attract the armature 60 toward the upper core 64 is then generated, namely, a force to move the exhaust valve 44 upwards in FIG. 2 is generated.

If the above-described force acts upon the armature 60, the armature 60 is caused to displace or move upwards in FIG. 2 along with the exhaust valve 44, against the biasing force of the upper spring 56. The exhaust valve 44 continues to be moved until the armature 60 abuts on the upper core 64, namely, until the exhaust valve 44 reaches the fully closed position.

As described above, the exhaust valve 44 can be brought into the fully closed position by supplying suitable exciting current to the upper coil 62, and can be also brought into the fully open position by supplying suitable exciting current to the lower coil 66. Thus, the solenoid-operated valve 40 makes it possible to repeatedly reciprocate the exhaust valve 44 between the fully open position and the fully closed position, by alternately supplying exciting current to the upper coil 62 and the lower coil 66.

The solenoid-operated valve 38 including the intake valve 42 operates in a similar manner to the solenoid-operated valve 40 as described above. In the first embodiment, the ECU 10 causes exciting current to be supplied alternately to the upper coil 62 and lower coil 66 of the respective solenoid-operated valves 38, 40 at a suitable timing, thereby to open and close the intake valve 42 and the exhaust valve 44 at a desired timing.

Referring back to FIG. 1, the internal combustion engine includes an intake manifold 80. The intake manifold 80 includes a plurality of branch pipes each of which communicates a surge tank 82 with a corresponding intake port 22. A fuel injection valve 83 is mounted in each of the branch pipes. The fuel injection valve 83 operates to inject fuel into the branch pipe in response to a command signal from the ECU 10.

An intake pipe 84 provided with a throttle valve 86 is connected to the upstream end of the surge tank 82 for communication therewith. An air flow meter 87 is provided in a portion of the intake pipe 84 that is located upstream of the throttle valve 86. The air flow meter 87 generates to the ECU 10 a signal representing the flow rate (which will be called "specific volume of intake air") of the air introduced by suction into the intake pipe 84. The ECU 10 then determines the specific volume of intake air based on the output signal of the air flow meter 87. An air cleaner 88 is connected to an upstream-side end portion of the intake pipe 84. Thus, ambient air that has passed through the air cleaner 88 flows into the intake pipe 84. In the meantime, an exhaust passage 90 communicates with the exhaust port 24 of the engine.

The engine is also provided with a crank angle sensor 94. The ECU 10 receives an output signal from the crank angle sensor 94, and determines a crank angle CA on the basis of the output signal from the crank angle sensor 94.

The internal combustion engine of the first embodiment is operable in a partial operating mode in which fuel injection and ignition are inhibited in a selected one or more cylinders, out of the four cylinders of the engine, so that the selected cylinders are deactivated or disabled (cylinder deactivation control). Under the cylinder deactivation control, fuel injection is stopped in the deactivated or inactive cylinders, and pumping loss is reduced, thus assuring improved fuel efficiency. For example, cylinder #1 and cylinder #4 are predetermined or pre-selected as such cylinders that are to be deactivated under cylinder deactivation control.

Under conventional cylinder deactivation control, the intake valve 42 and exhaust valve 44 of each inactive cylinder are kept closed. Where a particular cylinder is predetermined or pre-selected as an inactive cylinder, and the intake valve 42 and exhaust valve 44 of the inactive cylinder are always kept closed, the pressure within the inactive cylinder is reduced since gas contained in the combustion chamber 26 of the inactive cylinder slowly leaks into the crankcase through a sliding surface of the piston 18. As a result, a difference in the peak value of the cylinder pressure arises between the active cylinders and the inactive cylinders, resulting in increased vibration of the engine as compared with the case where the engine operates in a full operating mode (as opposed to the partial operating mode) with all of the four cylinders being activated.

In the internal combustion engine of the first embodiment, on the other hand, the exhaust valve 44 of each inactive cylinder is opened at an appropriate timing, so as to avoid reduction in the pressure within the inactive cylinder, and suppress the vibration of the engine.

Initially, some explanation will be made on changes in the pressure within each cylinder when the intake valve 42 and exhaust valve 44 of each inactive cylinder are kept closed under cylinder deactivation control, and the resulting vibration of the engine, as compared with pressure changes and vibration that occur when the engine is in a full operating mode with all of the cylinders being activated.

Figure 3:
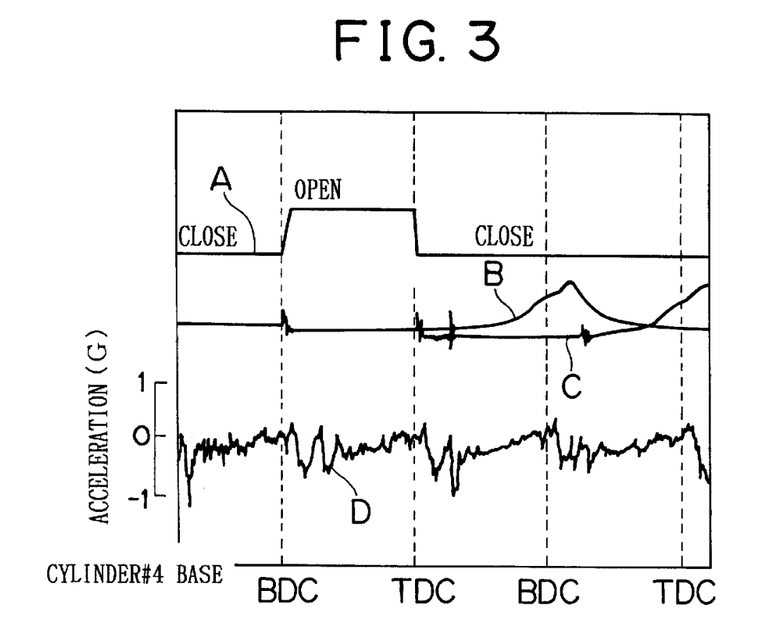
FIG. 3 is a graphical representation showing open and closed states of an exhaust valve of cylinder #4 when the engine is in a full operating mode with all of the cylinders activated, changes in the pressures within cylinders #3 and #4 with time, and vibration waveform of the engine.
Figure 4:
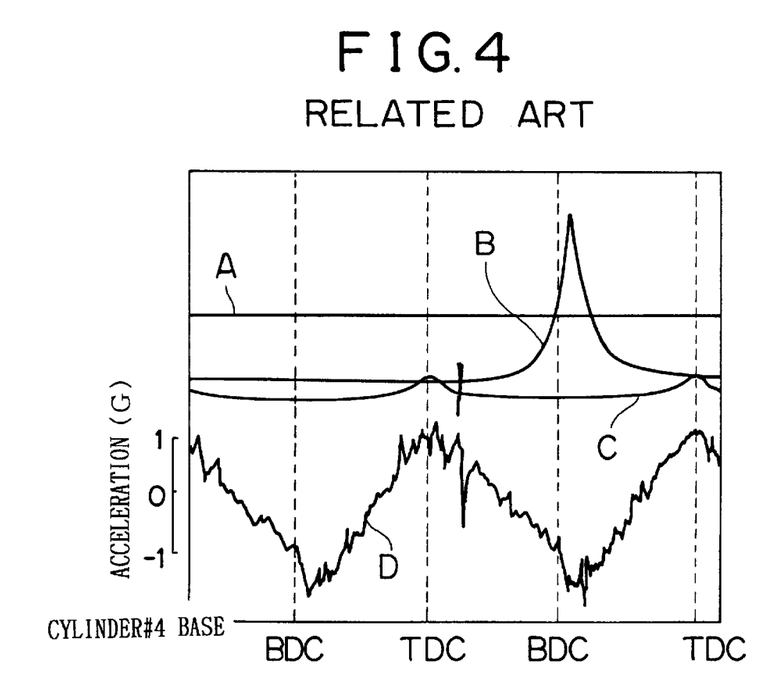
FIG. 4 is a graphical representation showing open and closed states of an exhaust valve of cylinder #4 when the engine is in a partial operating mode with part of the cylinders deactivated, changes in the pressures within cylinders #3 and #4 with time, and vibration waveform of the engine.

FIG. 3 shows the opening and closing actions (A) of the exhaust valve 44 of cylinder #4, changes (B and C) in the pressures within cylinders #3 and #4, respectively, and vibration waveform (D) of the engine when the engine is in a full operating mode with all cylinders being activated. FIG. 4 shows the case where the intake valve 42 and exhaust valve 44 of each deactivated or inactive cylinder are kept closed during execution of the above-described cylinder deactivation control.

While FIG. 3 and FIG. 4 show the pressures within the cylinders #3 and #4 as typical examples, the pressures within the cylinders #1 and #2 show substantially the same changes. The vibration waveform (D) of the engine as shown in FIG. 3 and FIG. 4 represents an output signal of an acceleration pickup that is mounted on the cylinder head 20 for measuring rolling vibration around the crankshaft, and the vertical axis indicates the acceleration. In FIG. 3 and FIG. 4, the horizontal axis indicates the crank angle of the engine, and is calibrated on the basis of the top dead center (TDC) and bottom dead center (BDC) of the piston 18 of the cylinder #4.

As shown in FIG. 3, the pressure within the cylinder #3 (B) and the pressure within the cylinder #4 (C) increase up to their peak values in synchronization with combustion timing of each cylinder while the engine is operating in a full operating mode with all of the cylinders being activated. Furthermore, the respective peak values are substantially equal to each other. In this case, the vibration of the engine can be suppressed to be relatively small, as is understood from the waveform (D) of FIG. 3.

Where the intake valve 42 and exhaust valve 44 of each inactive cylinder are kept closed during execution of cylinder deactivation control, on the other hand, the pressure within the inactive cylinder is reduced because of leakage of gas from the combustion chamber 26 of the inactive cylinder into the crankcase. Accordingly, the pressure within the cylinder #4 as an inactive cylinder increases only by a small degree when the piston 18 almost reaches the top dead center, as shown in FIG. 4, and its peak value is considerably small. While the engine is operating in a partial operating mode with at least one of the cylinders being deactivated, each of the active cylinders is required to generate a larger magnitude of torque than the torque generated by each cylinder in a full operating mode (with all of the cylinders activated), in order to provide the same output torque as that obtained in the full operating mode. To this end, the peak value of the pressure (B) within the cylinder #3 as an active cylinder is larger than the peak value that is achieved when the engine is in a full operating mode with all of the cylinders activated (FIG. 3).

As described above, where the intake valve 42 and exhaust valve 44 of each inactive cylinder are kept closed under cylinder deactivation control, the pressure within the inactive cylinder is reduced while the pressure within each active cylinder is increased, resulting in an increased difference in the cylinder pressure between the inactive cylinders and the active cylinders. With the four-cylinder engine taken as a whole, four peaks appear in the cylinder pressures at intervals of 180 CA (crank angle) when the engine is in a full operating mode with all of the cylinders activated, whereas two peaks larger than those in the full operating mode appear in the cylinder pressures at intervals of 360 CA when the engine is in a partial operating mode with part of the cylinders deactivated. Namely, larger peaks of the cylinder pressures appear at longer intervals during execution of cylinder deactivation control, as compared with the peaks appearing in the full operating mode of the engine. Consequently, the output torque of the engine varies to a greater extent, and the vibration (D in FIG. 4) of the engine during execution of cylinder deactivation control is increased as compared with the vibration (D in FIG. 3) that occur in the full engine operating mode with all cylinders activated.

Figure 5:
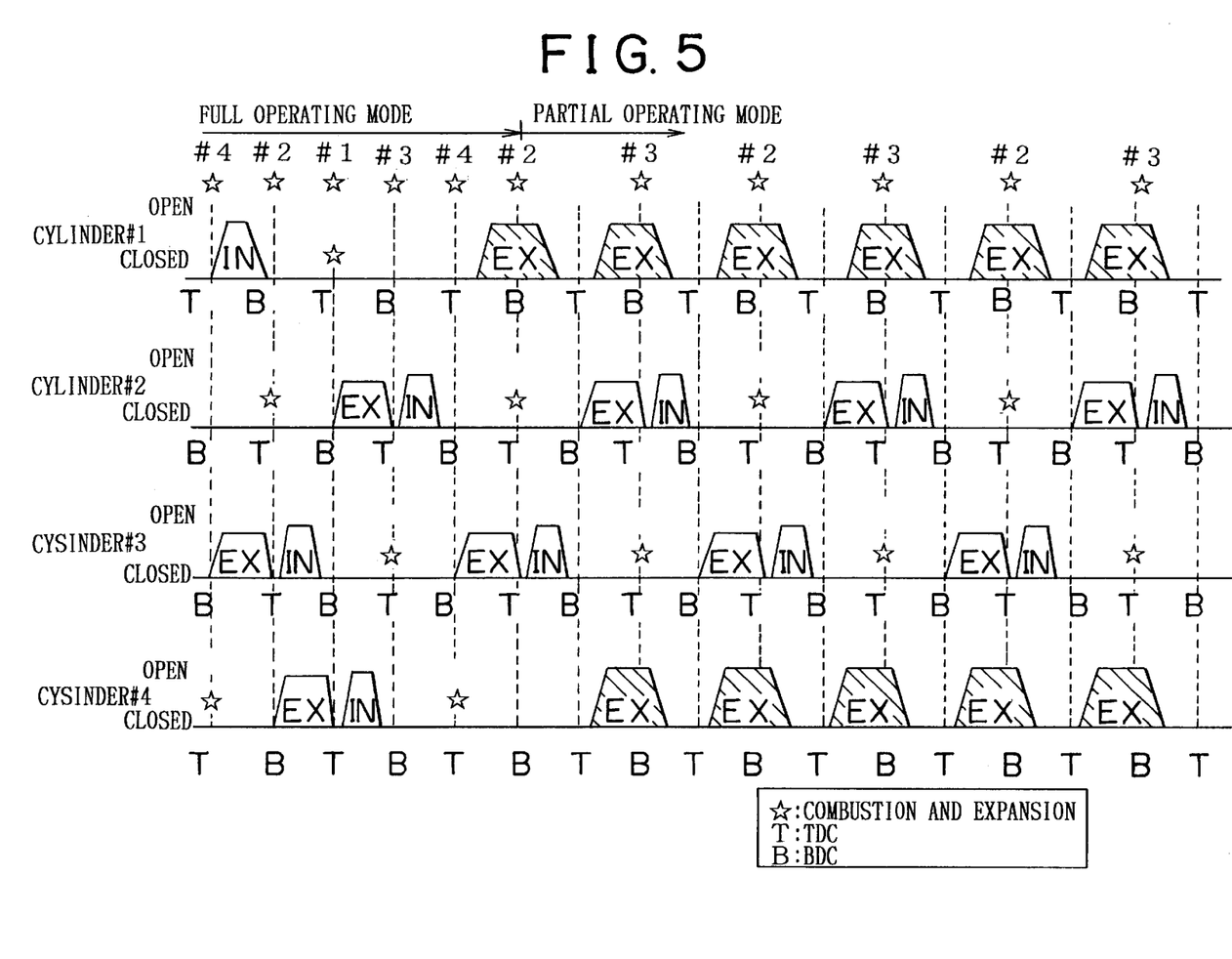
FIG. 5 is a time chart showing the opening and closing actions of the intake valve and exhaust valve of each cylinder when the engine starts operating in a partial operating mode with part of the cylinders deactivated, from a full operating mode with all of the cylinders activated.
Figure 6:
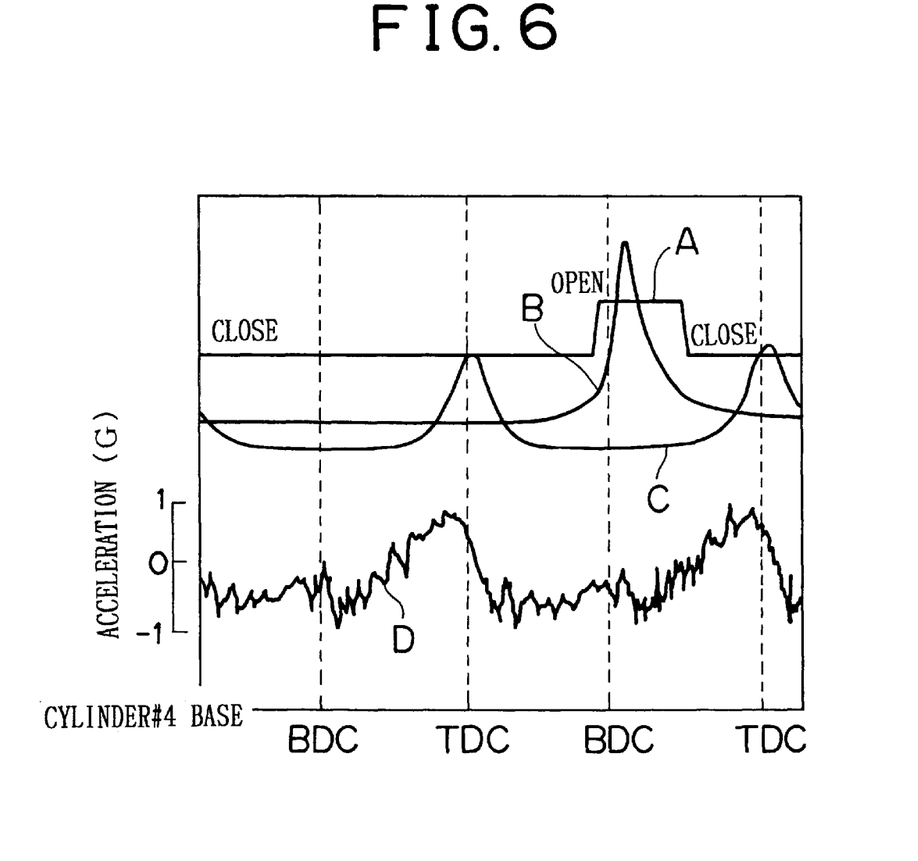
FIG. 6 is a graphical representation showing open and closed states of an exhaust valve of cylinder #4 when the engine is in a partial operating mode with part of the cylinders deactivated according to the invention, changes in the pressures within cylinders #3 and #4 with time, and vibration waveform of the engine.

FIG. 5 is a time chart showing the opening and closing actions of the intake valve 42 and exhaust valve 44 of each of the cylinders #1 through #4 when the engine of the first embodiment shifts from a full operating mode with all of the cylinders activated, to a partial operating mode with part of the cylinders deactivated. In FIG. 5 and similar time charts as shown later, "IN" and "EX" represent the intake valve 42 and the exhaust valve 44, respectively. The horizontal axis indicates the crank angle of the engine, and is calibrated based on the top dead center (TDC) and bottom dead center (BDC) of the piston 18 of each cylinder, and the top row in the figure indicates the number of the cylinder in which combustion and expansion takes place. FIG. 6 shows changes in the pressures within the cylinders #3 and #4 and the vibration of the engine when the intake valve 42 and the exhaust valve 44 of each inactive cylinder are opened and closed according to the time charts of FIG. 5.

In the first embodiment, ignition is inhibited in the cylinder #1 and cylinder #4 as inactive cylinders during execution of cylinder deactivation control, and the exhaust valve 44 is opened for a certain period of time that starts ahead of the bottom dead center (BDC), as indicated by hatched areas in FIG. 5. During the operation of the engine, the exhaust passage 90 is filled with exhaust gas whose pressure is substantially equal to the atmospheric pressure. If the exhaust valve 44 is opened, therefore, the exhaust gas is reintroduced from the exhaust passage 90 into the combustion chamber 26, so that the pressure within the inactive cylinder increases to be substantially equal to the atmospheric pressure. If the exhaust valve 44 is then closed in the course of displacement of the piston 18 toward the top dead center, the exhaust gas that has been reintroduced into the combustion chamber 26 is compressed. Thus, the pressure within the cylinder #4 as an inactive cylinder is increased after the exhaust valve 44 is closed, as shown in FIG. 6, so that a difference between the pressure within the cylinder #3 and that within the cylinder #4 is reduced. Consequently, the vibration (as represented by waveform D in FIG. 6) of the engine is suppressed or reduced as compared with the case of the cylinder deactivation control as shown in FIG. 4.

In this connection, the pressure of the inactive cylinder may exceed the atmospheric pressure at around the top dead center location. Even if the exhaust valve 44 is opened in this state, exhaust gas cannot be reintroduced from the exhaust passage 90 into the combustion chamber 26. Accordingly, the valve-opening timing of the exhaust valve 44 associated with the inactive cylinder is set to a point of time when the piston 18 moves from the top dead center toward the bottom dead center until the cylinder pressure becomes equal to or smaller than the atmospheric pressure.

The peak value of the pressure within the inactive cylinder depends upon the timing in which the exhaust valve 44 is closed. Namely, as the valve-closing timing of the exhaust valve 44 is closer to the bottom dead center, the peak value of the cylinder pressure is increased because of a large compression ratio of the reintroduced exhaust gas. The valve-closing timing of the exhaust valve 44 is determined depending upon the engine load, so that a change in the acceleration of the engine vibration due to the pressure within the inactive cylinder approximately coincides with a change in the acceleration of the engine vibration due to the pressure within the active cylinder.

A control routine to be executed by the ECU 10 in the first embodiment will be now explained.

Figure 7:
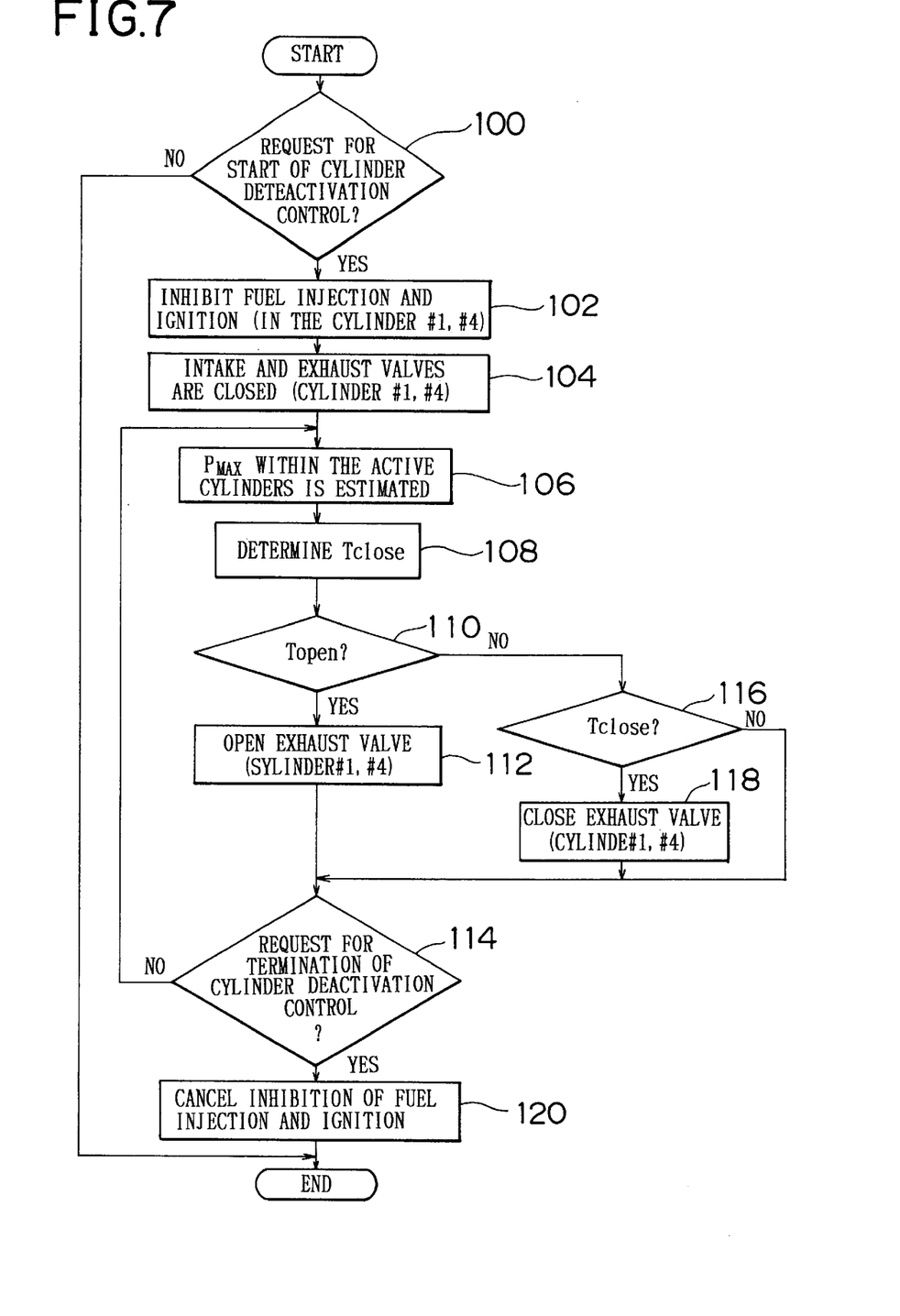
FIG. 7 is a flowchart of a control routine to be executed by an ECU for performing cylinder deactivation control in the first embodiment.

FIG. 7 is a flowchart of a cylinder deactivation control routine to be executed by the ECU 10 in the first embodiment. This routine is started in a repeated manner.

Once the first routine is started, step 100 is initially executed. In step 100, the presence of a request for start of cylinder deactivation control is determined, namely, whether cylinder deactivation control is requested to be started or not is determined. If no request for start of cylinder deactivation control is generated, namely, if a negative decision (NO) is obtained in step 100, the current cycle of the control routine is terminated. If a request for start of cylinder deactivation control is generated, namely, if an affirmative decision (YES) is obtained in step 100, step 102 is then executed.

In step 102, an operation for inhibiting fuel injection and ignition in the cylinder #1 and cylinder #4 is performed.

In step 104, the intake valves 42 and exhaust valves 44 of the cylinder #1 and cylinder #4 are closed. This valve-closing operation is performed at a point of time when the combustion stroke and exhaust stroke are finished.

In step 106, a peak value $P_{MAX}$ of the pressure within the active cylinders is estimated. The pressure within the active cylinders is substantially proportional to the load of the engine. In this step 106, therefore, the peak value $P_{MAX}$ is estimated based upon the specific volume of intake air. Here, the peak value $P_{MAX}$ of the cylinder pressure may be directly detected by a cylinder pressure sensor that is provided in the cylinder #2 or cylinder #3 as an active cylinder.

In step 108, the valve-closing timing $T_{close}$ of the exhaust valves 44 of the inactive cylinders is determined based on the peak value $P_{MAX}$ of the pressure within the active cylinders.

Step 110 is then executed to determine whether the current point of time is the valve-opening timing $T_{open}$ of the exhaust valves 44 of the inactive cylinders or not. As described above, the valve-opening timing $T_{open}$ is set in advance to a point of time at which the pressure within the inactive cylinders falls below the atmospheric pressure. If the current point of time is the valve-opening timing $T_{open}$, namely, if an affirmative decision (YES) is obtained in step 110, step 112 is executed to open the exhaust valves 44 of the cylinder #1 and cylinder #4, and step 114 is then executed. If the current point of time is not the valve-opening timing $T_{open}$, namely, if a negative decision (NO) is obtained in step S110, on the other hand, step 116 is executed.

In step 116, it is determined whether the current point of time is the valve-closing timing $T_{close}$ of the exhaust valves 44 of the cylinder #1 and cylinder #4. If the current point of time is the valve-closing timing $T_{close}$, namely, if an affirmative decision (YES) is obtained in step 116, step 118 is executed to close the exhaust valves 44 of the cylinder #1 and cylinder #4, and step 114 is then executed. If the current point of time is not the valve-closing timing $T_{close}$, namely, if a negative decision (NO) is obtained in step S116, step 114 is immediately executed.

In step 114, the presence of a request for termination of cylinder deactivation control is determined, namely, whether cylinder deactivation control is requested to be terminated or not is determined. If no request for termination is generated, namely, a negative decision (NO) is obtained in step 114, the control flow returns to step 106. If a request for termination is generated, namely, if an affirmative decision (YES) is obtained in step 114, step 120 is executed to perform an operation to cancel inhibition of fuel injection and ignition of the cylinder #1 and cylinder #4, and then the current cycle of the routine is terminated.

As described above, in the internal combustion engine of the first embodiment, the exhaust valves 44 of the inactive cylinders are opened during cylinder deactivation control, thereby to increase the pressure within the inactive cylinders. During cylinder deactivation control, therefore, a difference between the pressure within the inactive cylinders and the pressure within the active cylinders can be reduced, and vibration of the engine can be suppressed.

Figure 8:
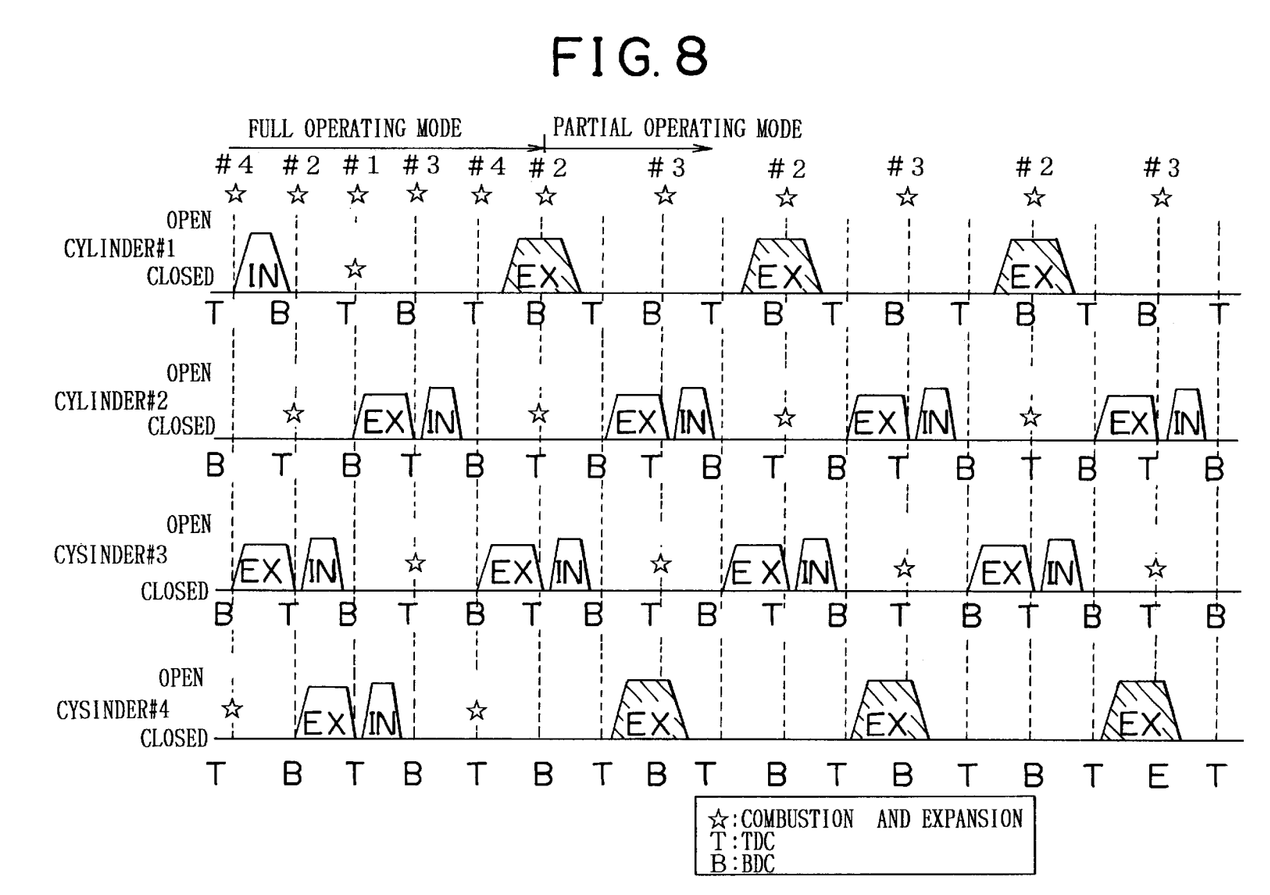
FIG. 8 is a time chart showing opening and closing actions of an intake valve and an exhaust valve of each cylinder when the engine starts operating in a partial operating mode with part of the cylinders deactivated, from a full operating mode with all of the cylinders activated.

In the above description of the first embodiment, the exhaust valve 44 associated with each of the cylinder #1 and cylinder #4 as inactive cylinders is opened only once during a single reciprocating motion of the piston 18. It is, however, unnecessary to open the exhaust valve 44 upon every reciprocation of the piston 18 since the pressure within the inactive cylinders is not immediately reduced after these cylinders are deactivated or disabled. For instance, the exhaust valves 44 associated with the cylinder #1 and cylinder #4 may be alternately opened each time the piston 18 reciprocates, as shown in FIG. 8. It is also possible to open the exhaust valve 44 each time the piston 18 reciprocates several times.

It may also be proposed to open the intake valve 42 so as to introduce new air into the combustion chamber 26. If the new air is introduced by suction into the combustion chamber 26 of an inactive cylinder, however, the new air is discharged directly into the exhaust passage 90 when the operation of the inactive cylinder is restarted. As a result, the air/fuel ratio measured in the exhaust passage 90 may be changed to the lean side, which may result in deterioration of the performance of catalyst for purifying exhaust gas. Also, where the new air is introduced into the combustion chamber 26 of the inactive cylinder, the interior of the cylinder is cooled, which may prevent the inactive cylinder from smoothly restarting its operation when it is activated again. In the first embodiment, since the exhaust valve 44 is opened so that burnt gas is re-introduced into the combustion chamber 26, the burnt gas is discharged again into the exhaust passage 90 when the operation of the inactive cylinder is restarted, thus causing no influence on the air/fuel ratio in the exhaust passage 90. Also, since high-temperature burnt gas is introduced into the combustion chamber 26, the inactive cylinder is prevented from being cooled. Thus, the first embodiment makes it possible to suppress vibration of the engine during cylinder deactivation control, while avoiding problems that would otherwise occur upon restart of the operations of the inactive cylinders after termination of cylinder deactivation control.

Next, a second embodiment of the invention will be described. While the construction of the internal combustion engine of the second embodiment is similar to that of the first embodiment, the second embodiment is different from the first embodiment in that the cylinders of the engine are successively selected as deactivated or inactive cylinders, namely, the cylinders are successively deactivated under cylinder deactivation control.

To successively deactivate or disable all of the cylinders under cylinder deactivation control, the engine may perform six-stroke cycle operations (six-stroke cycle cylinder deactivation control). The second embodiment is adapted to suppress vibration of the engine during execution of the six-stroke cycle cylinder deactivation control.

Initially, the operation of the engine under six-stroke cycle cylinder deactivation control will be described.

Figure 9:
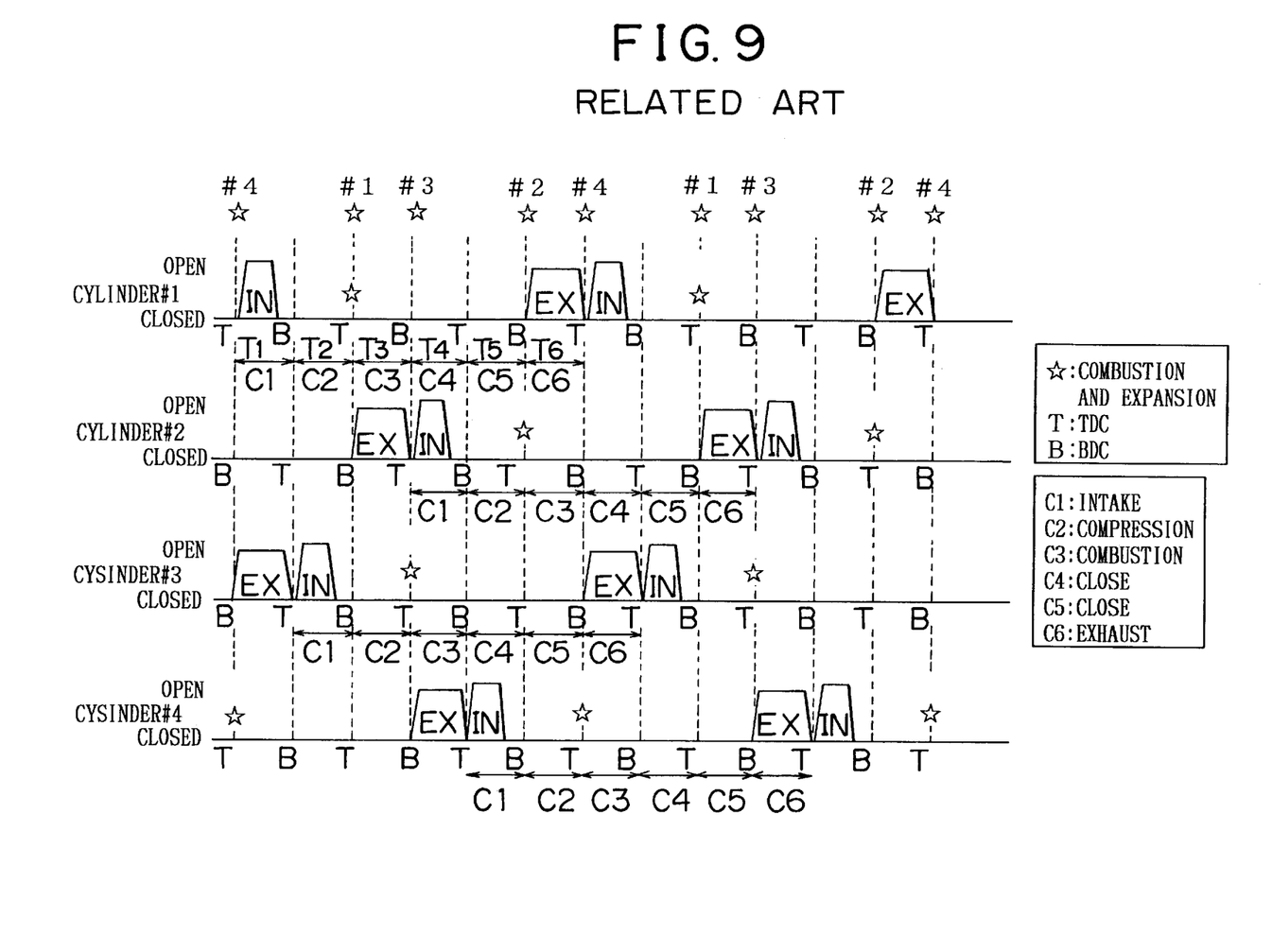
FIG. 9 is a time chart showing opening and closing actions of an intake valve and an exhaust valve of each cylinder when the engine operates on a conventional six-stroke cycle with the cylinders successively deactivated.

FIG. 9 is a time chart showing the opening and closing actions of the intake valves 42 and exhaust valves 44 of the cylinder #1 through cylinder #4, where the intake valve 42 and exhaust valve 44 associated with each cylinder are kept closed during the time in which the piston 18 reciprocates once from the bottom dead center at which the combustion stroke ends to the next bottom dead center so that the four cylinders are successively deactivated or disabled.

In the cylinder #1 as shown in FIG. 9, for example, the intake stroke and the compression stroke take place in the periods T1 and T2, respectively, and the combustion stroke takes place in the following period T3. The intake valve 42 and exhaust valve 44 are kept closed in the periods T4 and T5 subsequent to the period T3, so that the cylinder #1 is deactivated. While the piston 18 moves toward the top dead center and the bottom dead center during the inactive periods T4 and T5, gas contained in the combustion chamber 26 is compressed and expanded while being disconnected or shut off from the intake port 22 and the exhaust port 24. After the exhaust stroke takes place with the exhaust valve 44 opened in the period T6, the intake stroke, compression stroke, combustion stroke, inactive compression stroke, inactive expansion stroke, and exhaust stroke are effected again. Similar operations are performed in the cylinders #2 through #4, as shown in FIGS. 9B–9D. Thus, under six-stroke cycle cylinder deactivation control, the engine operates on the six-stroke cycle consisting of the intake, compression, combustion, inactive compression, inactive expansion, and exhaust strokes, and the cylinder #1, cylinder #3, cylinder #2, and cylinder #4 are successively selected as an inactive cylinder in this order, i.e., in the order in which combustion takes place.

It will be understood from FIG. 9 that combustion in the #3 cylinder is delayed 180 CA (crank angle) relative to that in the cylinder #1, and combustion in the cylinder #2 is delayed 360 CA relative to that in the cylinder #3. Also, combustion in the cylinder #4 is delayed 180 CA relative to that in the #2 cylinder, and the combustion in the cylinder #1 is delayed 360 relative to that in the cylinder #4. In comparison with a normal engine operation in which combustion successively occurs in the four cylinders at intervals of 180 CA, the engine operation as shown in FIG. 9 is characterized in that a pause exists between combustion in the cylinder #3 and that in the cylinder #2, and between combustion in the cylinder #4 and that in the cylinder #1 while combustion successively takes place in the order of #1 cylinder→#3 cylinder→#2 cylinder→#4 cylinder.

Figure 10A:
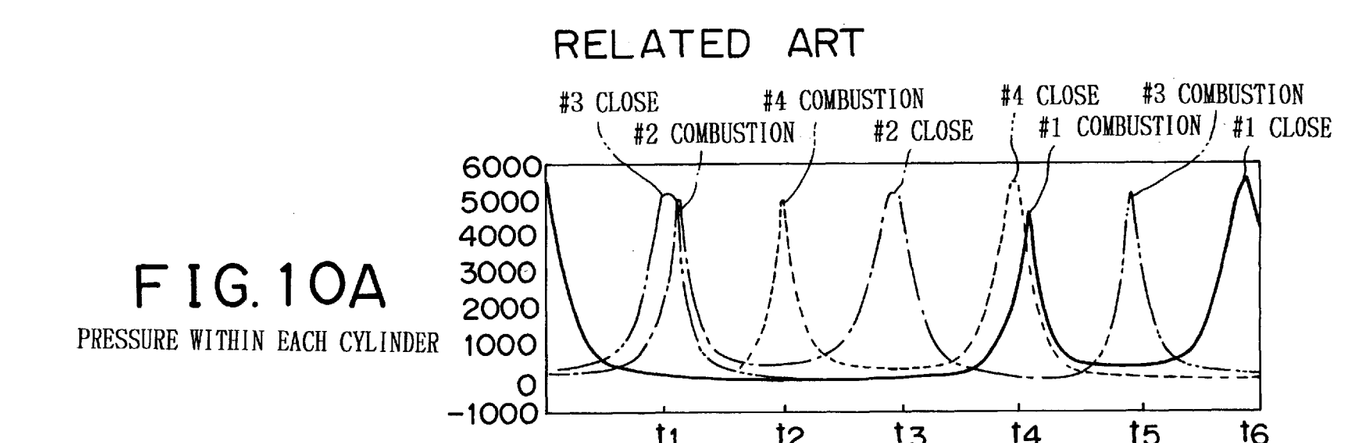
FIG. 10A is a graphical representation showing changes in the pressure within each cylinder with time in the engine that operates on a six-stroke cycle under conventional cylinder deactivation control.
Figure 10B:
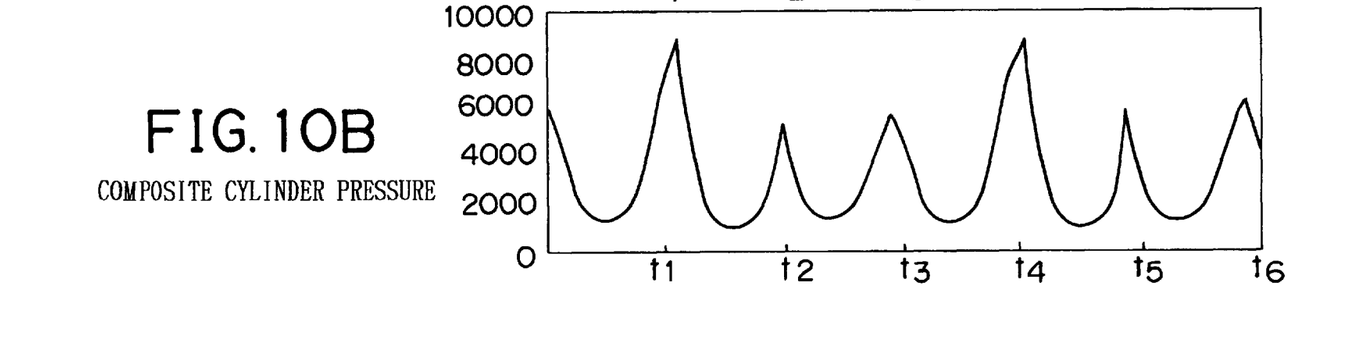
FIG. 10B is a graphical representation showing changes in the composite cylinder pressure with time in the engine that operates on a six-stroke cycle under conventional cylinder deactivation control.

FIG. 10A shows changes in the pressures within the cylinders #1 through #4 over the six-stroke cycle, as indicated by a solid line, one-dot chain line, two-dot chain line, and a broken line, respectively, where the engine operates according to the time chart of FIG. 9. FIG. 10B shows changes in the sum of the pressures within all of the cylinders (cylinders #1 through #4) (which will be called "composite cylinder pressure").

As described above with respect to the first embodiment, gas leaks little by little from the combustion chamber 26 of the inactive cylinder toward the crankcase. Where each cylinder is deactivated immediately after the combustion stroke under the above six-stroke cycle cylinder deactivation control, for example, almost all the burnt gas remains in the combustion chamber 26 of the currently deactivated cylinder without leaking. In this case, if the piston 18 moves toward the top dead center in the currently deactivated cylinder, the burnt gas is compressed, whereby the cylinder pressure increases to substantially the same level as that achieved at the time of combustion when the piston 18 reaches the top dead center. As shown in FIG. 10A, therefore, the pressure within each cylinder reaches its maximum level at the top dead center at which the combustion stroke begins, and the following top dead center. Namely, two peaks per six-stroke cycle appear in the pressure within each cylinder.

As is understood from FIG. 9, combustion occurs in the cylinder #2 when the piston of the cylinder #3 as a currently deactivated cylinder is located close to the top dead center. As is also understood from FIG. 9, combustion occurs in the cylinder #1 when the piston of the cylinder #4 as a currently deactivated cylinder is located close to the top dead center. Thus, a peak of the cylinder pressure resulting from the combustion in the cylinder #2 and a peak of the cylinder pressure resulting from compression of gas in the cylinder #3 as a currently deactivated cylinder appear at almost the same time at around time "t1" in FIG. 10A. Similarly, a peak of the cylinder pressure resulting from the combustion in the cylinder #1 and a peak of the cylinder pressure resulting from compression of gas in the cylinder #4 as a currently deactivated cylinder appear at almost the same time at around time "t4" in FIG. 10A. On the other hand, a single peak of the cylinder pressure appears at around time "t2", "t3", "t5" and "t6", which peak results from the combustion in the cylinder #4 as an active cylinder, compression of gas in the cylinder #2 as an inactive cylinder, combustion in the cylinder #3 as an active cylinder, and compression of gas in the cylinder #1 as an inactive cylinder, respectively. As shown in FIG. 10B, therefore, the peak value of the composite cylinder pressure at around time "t1" and "t4" at which the pressures within two cylinders increase at almost the same time differs from the peak value of the composite cylinder pressure at around time "t2", "t3", "t5" and "t6" at which the pressure within only one cylinder increases. Consequently, the vibration of the engine is increased.

In the internal combustion engine of the second embodiment, where the piston of the currently deactivated cylinder reaches the top dead center at the same time that combustion takes place in another cylinder, the exhaust valve 44 associated with the deactivated cylinder is opened so as to avoid an increase in the pressure within the deactivated cylinder, thereby to suppress vibration of the engine.

Figure 11:
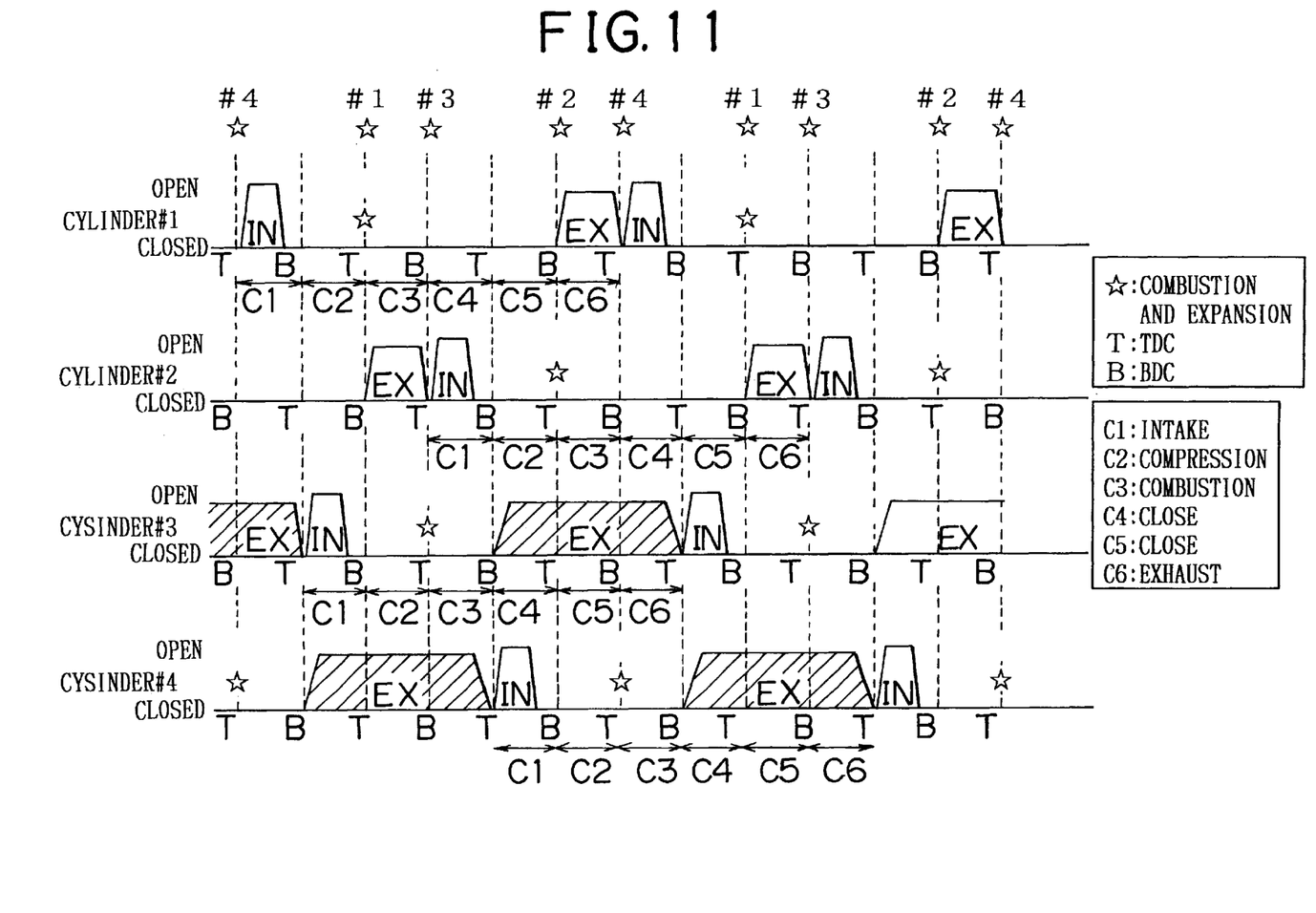
FIG. 11 is a time chart showing the opening and closing actions of an intake valve and an exhaust valve of each cylinder when the engine operates on a six-stroke cycle under cylinder deactivation control according to the invention.

FIG. 11 is a time chart showing opening and closing actions of the intake valves 42 and exhaust valves 44 of the cylinders #1 through #4 in the second embodiment. In the cylinder #3 and cylinder #4, the exhaust valve 44 is opened during a rest period or inactive period after completion of each combustion stroke, as indicated by hatched areas in FIG. 11.

Figure 12A:
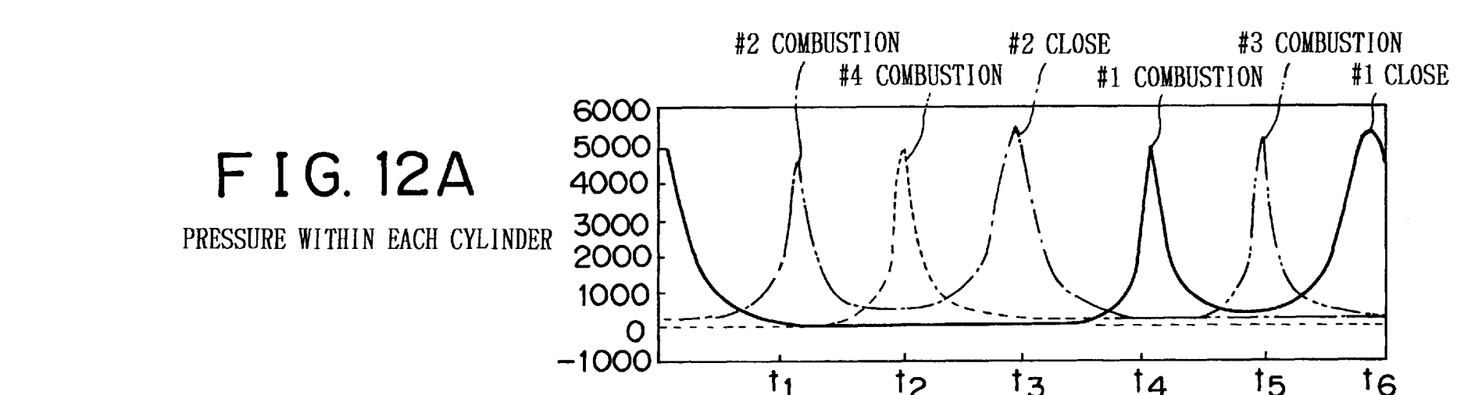
FIG. 12A is a graphical representation showing changes in the pressure within each cylinder with time in the engine that operates on a six-stroke cycle under cylinder deactivation control of the invention.
Figure 12B:
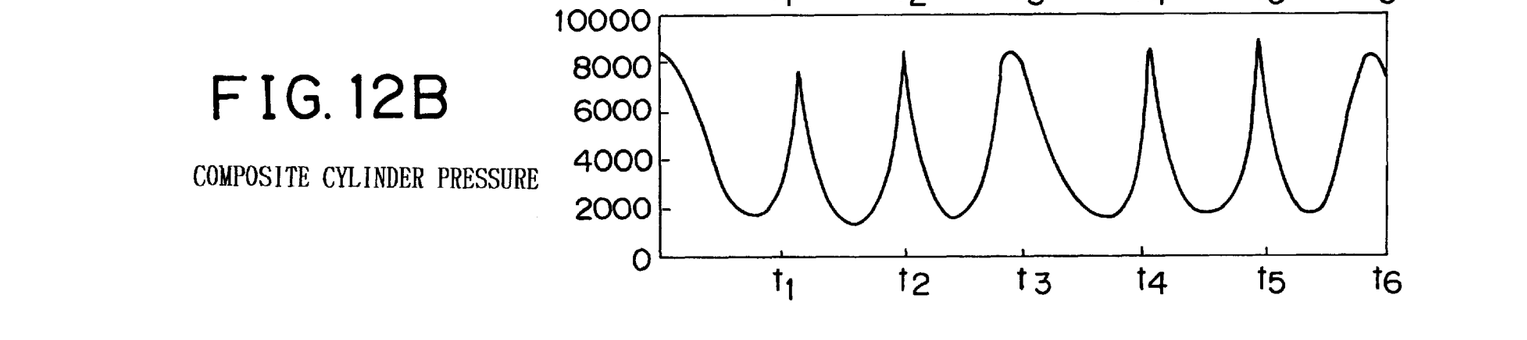
FIG. 12B is a graphical representation showing changes in the composite cylinder pressure with time in the engine that operates on a six-stroke cycle under cylinder deactivation control of the invention.

FIG. 12A shows changes in the pressure within each cylinder where the engine operates according to the time chart of FIG. 11. FIG. 12B shows changes in the composite cylinder pressure. The exhaust valve 44 associated with a currently deactivated cylinder is opened during the time in which the cylinder #3 and cylinder #4 are deactivated, and therefore the relevant cylinder pressure does not increase even if the piston 18 moves toward the top dead center. Thus, the pressure within the cylinder #3 that is being deactivated is kept at a relatively low level when the pressure within the cylinder #2 increases due to combustion in the cylinder #2 at around time "t1", as shown in FIG. 12A. Similarly, the pressure within the currently deactivated cylinder #4 is kept at a relatively low level when the pressure within the cylinder #1 increases due to combustion in the cylinder #1 at around time "t4". In other words, a peak of the pressure within each cylinder appears alone or separately. Consequently, a peak value of the composite cylinder pressure of the engine is kept generally constant, and the vibration of the engine can be suppressed.

In the second embodiment, the exhaust valve 44 of the currently deactivated cylinder is opened when the piston of the deactivated cylinder reaches the top dead center at the same time that combustion occurs in another cylinder, under six-stroke cycle cylinder deactivation control. With this arrangement, an increase in the cylinder pressure due to combustion in an active cylinder and an increase in the pressure within a currently deactivated cylinder do not take place at the same time. It is thus possible to suppress vibration of the engine during execution of six-stroke cycle cylinder deactivation control.

In the case where particular cylinders are selected or predetermined as inactive cylinders, the inactive cylinders suffer from reduction in the temperature and a lack of lubricating oil, and may not be re-activated smoothly. According to the six-stroke cycle cylinder deactivation control, on the other hand, all of the cylinders are successively caused to operate as an inactive or deactivated cylinder, and are therefore free from the above-described problems.

In the second embodiment, the ECU 10 causes the exhaust valves 44 associated with the cylinder #1 and cylinder #4 to be opened in such timing as indicated in FIG. 11, thereby to control the pressures within the inactive cylinders.

While the exhaust valve 44 associated with the cylinder #3 or cylinder #4 is caused to open over the entire inactive period of the relevant cylinder as shown in the time charts of FIG. 11, the valve opening/closing timing of the exhaust valve 44 of the inactive cylinder is preferably determined experimentally, so that the vibration of the engine can be minimized.

It may be proposed to open the intake valve 42 as means for reducing the pressure within the deactivated cylinder. If the intake valve 42 is opened, however, burnt gas in the inactive or deactivated cylinder flows into active cylinders through the intake pipe 84, and adversely affects the operation of the active cylinders. The second embodiment is free from such a problem since the pressure within the inactive cylinder is reduced by opening the exhaust valve 44 rather than the intake valve 42.

In the illustrated embodiment, the engine controller (ECU 10) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein and in the flowchart shown in FIG. 7 can be used as the controller. A distributed processing architecture can be used for maximum data/signal processing capability and speed.

While the invention has been described with reference to preferred embodiments thereof, it is to be understood that the invention is not limited to the disclosed embodiments or constructions. To the contrary, the invention is intended to cover various modifications and equivalent arrangements. In addition, while the various elements of the disclosed invention are shown in various combinations and configurations, which are exemplary, other combinations and configurations, including more, less or only a single element, are also within the spirit and scope of the invention.

What is claimed is:

1. An internal combustion engine comprising:
   a plurality of cylinders;
   at least one solenoid-operated intake valve and at least one solenoid-operated exhaust valve associated with each of said plurality of cylinders; and
   a controller that operates at least one of the plurality of cylinders as an inactive cylinder in a cylinder deactivation mode in which an intake stroke, a combustion stroke, and an exhaust stroke are inhibited and that controls a pressure within the inactive cylinder that is operated in the cylinder deactivation mode, wherein the controller controls the pressure within the inactive cylinder by opening and closing the exhaust valve associated with the inactive cylinder and the controller operates at least one inactive cylinder pre-selected from the plurality of cylinders in the cylinder deactivation mode and increases the pressure within the inactive cylinder.

2. An internal combustion engine according to claim 1, wherein the controller increases the pressure within the inactive cylinder, based on a pressure within a cylinder other than the inactive cylinder.

3. An internal combustion engine according to claim 1, wherein the controller successively deactivates the plurality of cylinders such that a currently deactivated cylinder as the inactive cylinder is operated in the cylinder deactivation mode, and reduces the pressure within the inactive cylinder when a first time at which a piston of the currently deactivated cylinder reaches a top dead center, and a second time at which at least one of the cylinders that is not operated in the cylinder deactivation mode is within a predetermined portion of its cycle.

4. An internal combustion engine according to claim 3, wherein the engine operates on a six-stroke cycle in the cylinder deactivation mode.

5. An internal combustion engine comprising:
   a plurality of cylinders;
   at least one solenoid-operated intake valve and at least one solenoid-operated exhaust valve associated with each of said plurality of cylinders; and
   a controller that operates at least one of the plurality of cylinders as an inactive cylinder in a cylinder deactivation mode in which an intake stroke, a combustion stroke, and an exhaust stroke are inhibited and that controls a pressure within the inactive cylinder that is operated in the cylinder deactivation mode, wherein the controller operates at least one inactive cylinder pre-selected from the plurality of cylinders in the cylinder deactivation mode and increases the pressure within the inactive cylinder.

6. An internal combustion engine according to claim 5, wherein the controller increases the pressure within the inactive cylinder based on a pressure within a cylinder other than the inactive cylinder.

7. An internal combustion engine according to claim 5, wherein the controller successively deactivates the plurality of cylinders such that a currently deactivated cylinder as the inactive cylinder is operated in the cylinder deactivation mode, and reduces the pressure within the inactive cylinder when a first time, at which a piston of the currently deactivated cylinder reaches a top dead center, and a second time, at which at least one of the cylinders that is not operated in the cylinder deactivation mode is within a predetermined portion of its cycle, is same.

8. An internal combustion engine according to claim 7, wherein the engine operates on a six-stroke cycle in the cylinder deactivation mode.

9. A control method of an internal combustion engine including at least one solenoid-operated intake valve and at least one solenoid-operated exhaust valve, the method comprising:
   operating at least one of a plurality of cylinders as an inactive cylinder in a cylinder deactivation mode in which an intake stroke, a combustion stroke, and an exhaust stroke are inhibited;

controlling a pressure within the inactive cylinder that is operated in the cylinder deactivation mode, wherein the pressure within the inactive cylinder is controlled by opening and closing the exhaust valve of the inactive cylinder;

controlling at least one inactive cylinder pre-selected from the plurality of cylinders in the cylinder deactivation mode; and increasing the pressure within the inactive cylinder.

10. A control method according to claim 9, further comprising increasing the pressure within the inactive cylinder based on a pressure within a cylinder other than the inactive cylinder.

11. A control method according to claim 9, further comprising:

successively deactivating the plurality of cylinders such that a currently deactivated cylinder as the inactive cylinder is operated in the cylinder deactivation mode; and reducing the pressure within the inactive cylinder when a first time at which a piston of the currently deactivated cylinder reaches a top dead center, and a second time at which at least one of the cylinders that is not operated in the cylinder deactivation mode is within a predetermined portion of its cycle.

12. A control method according to claim 11, wherein the internal combustion engine operates on a six-stroke cycle in the cylinder deactivation mode.

13. A control method of an internal combustion engine including at least one solenoid-operated intake valve and at least one solenoid-operated exhaust valve, the method comprising:

operating at least one of a plurality of cylinders as an inactive cylinder in a cylinder deactivation mode in which an intake stroke, a combustion stroke, and an exhaust stroke are inhibited;

controlling a pressure within the inactive cylinder that is operated in the cylinder deactivation mode;

controlling at least one inactive cylinder pre-selected from the plurality of cylinders in the cylinder deactivation mode; and increasing the pressure within the inactive cylinder.

14. A control method according to claim 13, further comprising increasing the pressure within the inactive cylinder based on a pressure within a cylinder other than the inactive cylinder.

15. A control method according to claim 13, further comprising:

successively deactivating the plurality of cylinders such that a currently deactivated cylinder as the inactive cylinder is operated in the cylinder deactivation mode; and reducing the pressure within the inactive cylinder at a first time at which a piston of the currently deactivated cylinder reaches a top dead center, and at a second time at which at least one of the cylinders that is not operated in the cylinder deactivation mode is within a predetermined portion of its cycle.

16. A control method according to claim 15, wherein the internal combustion engine operates on a six-stroke cycle in the cylinder deactivation mode.

* * * * *